United States Patent
Marti et al.

(10) Patent No.: US 9,894,196 B2
(45) Date of Patent: *Feb. 13, 2018

(54) CATEGORY-BASED FENCE

(71) Applicant: Apple Inc., Cupertino, CA (US)

(72) Inventors: Lukas M. Marti, Santa Clara, CA (US); Shannon M. Ma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,195

(22) Filed: Dec. 19, 2016

(65) Prior Publication Data

US 2017/0099381 A1    Apr. 6, 2017

Related U.S. Application Data

(63) Continuation of application No. 14/942,907, filed on Nov. 16, 2015, now Pat. No. 9,525,771, which is a continuation of application No. 13/912,088, filed on Jun. 6, 2013, now Pat. No. 9,191,832.

(51) Int. Cl.
*H04W 24/00* (2009.01)
*H04M 1/725* (2006.01)
(Continued)

(52) U.S. Cl.
CPC ....... *H04M 1/72572* (2013.01); *H04W 4/001* (2013.01); *H04W 4/008* (2013.01);
(Continued)

(58) Field of Classification Search
CPC . H04M 1/72572; H04W 4/001; H04W 1/021; H04W 1/008; H04W 1/043; H04W 1/06
(Continued)

(56) References Cited

U.S. PATENT DOCUMENTS

| 8,150,991 B1 | 4/2012 | Sobel et al. |
| 8,688,726 B2 | 4/2014 | Mahajan et al. |

(Continued)

OTHER PUBLICATIONS

Bareth, Ulrich, et al., "geoXmart—A Marketplace for Geofence-Based Mobile Services," in *Computer Software and Applications Conference (COMPSAC), 2010 IEEE 34th Annual*, Jul. 19-23, 2010, pp. 101-106.

(Continued)

*Primary Examiner* — Khai M Nguyen
(74) *Attorney, Agent, or Firm* — Fish & Richardson P.C.

(57) ABSTRACT

Techniques of category-based fence are described. A category-based fence can correspond to a group of signal sources instead of a point location fixed to latitude and longitude coordinates. The group of signal sources can represent a category of entities, e.g., a particular business chain. The signal sources can be distributed to multiple discrete locations. A category-based fence associated with the group, accordingly, can correspond to multiple locations instead of a single point location and a radius. Each signal source in the group can be associated with a category identifier unique to the group and uniform among signal sources in the group. The category identifier can be programmed into each signal source. A mobile device can enter the category-based fence by entering any of the discrete locations when the mobile device detects the signal identifier. The mobile device can then execute an application program associated with the category-based fence.

20 Claims, 9 Drawing Sheets

(51) Int. Cl.
*H04W 4/00* (2009.01)
*H04W 4/02* (2009.01)
*H04W 4/04* (2009.01)
*H04W 4/06* (2009.01)

(52) U.S. Cl.
CPC ........... *H04W 4/021* (2013.01); *H04W 4/043* (2013.01); *H04W 4/06* (2013.01)

(58) Field of Classification Search
USPC ............ 455/456.3, 456.1, 418, 414.1, 404.2, 455/435.1
See application file for complete search history.

(56) References Cited

U.S. PATENT DOCUMENTS

| | | | | |
|---|---|---|---|---|
| 8,755,824 B1* | 6/2014 | Wang | .................... | H04W 4/021 340/539.13 |
| 9,191,832 B2* | 11/2015 | Marti | .................... | H04W 4/008 |
| 9,525,771 B2* | 12/2016 | Marti | .................... | H04W 4/008 |
| 2010/0302056 A1 | 12/2010 | Dutton et al. | | |
| 2011/0153525 A1 | 6/2011 | Benco et al. | | |
| 2012/0042036 A1 | 2/2012 | Lau et al. | | |
| 2012/0046040 A1 | 2/2012 | Chatterjee et al. | | |
| 2012/0115512 A1 | 5/2012 | Grainger et al. | | |
| 2012/0284769 A1 | 11/2012 | Dixon et al. | | |
| 2013/0030931 A1* | 1/2013 | Moshfeghi | .............. | G01S 19/48 705/16 |
| 2013/0072226 A1 | 3/2013 | Thramann et al. | | |
| 2013/0143586 A1 | 6/2013 | William et al. | | |
| 2014/0274150 A1 | 9/2014 | Marti et al. | | |
| 2014/0364100 A1 | 12/2014 | Marti et al. | | |

OTHER PUBLICATIONS

International Search Report and Written Opinion from PCT Application No. PCT/US2014/040265, dated Sep. 24, 2014, 10 pages.

* cited by examiner

CATEGORY-BASED FENCE

CROSS-REFERENCE TO RELATED APPLICATION

This application is a continuation of and claims priority to U.S. patent application Ser. No. 14/942,907, filed on Nov. 16, 2015, which is a continuation of U.S. patent application Ser. No. 13/912,088, filed on Jun. 6, 2013, issued as U.S. Pat. No. 9,191,832, on Nov. 17, 2015, the entire contents of each of which are incorporated herein by reference.

TECHNICAL FIELD

This disclosure relates generally to geofencing.

BACKGROUND

Some mobile devices have features for providing location-based services. For example, a mobile device can execute a pre-specified application program or present certain content when the mobile device enters or exits a geofence. The geofence can be defined by a point location and a radius. The point location can have a longitude coordinate and a latitude coordinate. The mobile device can determine that the mobile device has entered the geofence or exited the geofence by determining an estimated location of the mobile device and calculating a distance between the estimated location and the point location. Based on whether the calculated distance exceeds the radius of the geofence, the mobile device can determine whether the mobile device entered or exited the geofence. The mobile device can determine the estimated location, which also includes a longitude coordinate and a latitude coordinate, using a global satellite system (e.g., GPS) or cellular triangulation.

SUMMARY

Techniques of category-based fence are described. A category-based fence can be a location-agnostic fence defined by signal sources having no geographic location information. The category-based fence can correspond to a group of signal sources instead of a point location fixed to latitude and longitude coordinates. The group of signal sources can represent a category of entities, e.g., a particular business chain. Each signal source need not have geographic information on where the signal source or the mobile device is located. Likewise, the mobile device need not have geographic information on where the signal sources are located. The signal sources can be distributed to multiple discrete locations. A category-based fence associated with the group, accordingly, can correspond to multiple locations instead of a single point location and a radius. Each signal source in the group can be associated with a category identifier unique to the group and uniform among signal sources in the group. The category identifier can be programmed into each signal source. A mobile device can enter the category-based fence by entering any of the discrete locations when the mobile device detects the signal identifier. The mobile device can then execute an application program associated with the category-based fence.

The features described in this specification can be implemented to achieve the following advantages. Compared to a conventional geofence, a category-based fence permits implementation of more complex location-based services. Rather than limiting a geofence to a single point location and radius, a category-based fence can have multiple locations, which can correspond to distributed operations of a business, government, or education entity. For example, a retail store chain located in multiple cities can define a category-based fence for the retail store chain. The category-based fence can have a portion of the fence in each of the multiple cities. A same application program that provides promotion information on mobile devices to customers of the retail store chain can be triggered when a customer walks into any store in any city with the mobile device.

Compared to a conventional geofence, a category-based fence permits implementation of more flexible location-based services. A category-based fence can change locations when the business implementing the category-based fence relocates. For example, if a business associated with a category-based fence moves from an original location to a new location, instead of changing the latitude and longitude coordinates of a geofence and broadcasting the change, the business can bring a signal source from the original location to the new location, and the changes to the fence are accomplished. Likewise, adding a new location to a category-based fence or removing a location from a category-based fence can be accomplished without reprogramming the fence. Adding a location can be accomplished by adding a signal source broadcasting the same category identifier as broadcast by other signal sources in the group defining the category-based fence. Removing a location can be accomplished by turning off a signal source in the group.

Compared to a conventional geofence, a category-based fence permits higher granularity. Since a category-based fence can be defined by multiple signal sources sharing a category identifier, each of the signal sources can be a low-energy signal source having a short communication range (e.g., 50 meters or less, when attenuation by furniture, walls, or human body is accounted for). The short range allows for precise definition of a category-based fence, which, in turn, can enhance user experience. For example, a category-based fence can trigger an application to display a new menu of a restaurant on a mobile device only when a customer carrying the mobile device enters the restaurant. Whereas, a conventional geofence that depends on latitude and longitude coordinates and GPS signals may trigger the menu to be displayed on a mobile device when a user of the mobile device is not at the restaurant (e.g., when the user walks cross the street), due to interference of GPS signals caused by surrounding buildings.

The details of one or more implementations of category-based fences are set forth in the accompanying drawings and the description below. Other features, aspects, and advantages of category-based fences will become apparent from the description, the drawings, and the claims.

BRIEF DESCRIPTION OF THE DRAWINGS

Like reference symbols in the various drawings indicate like elements.

DETAILED DESCRIPTION

Exemplary Category-Based Fence

Figure 1:
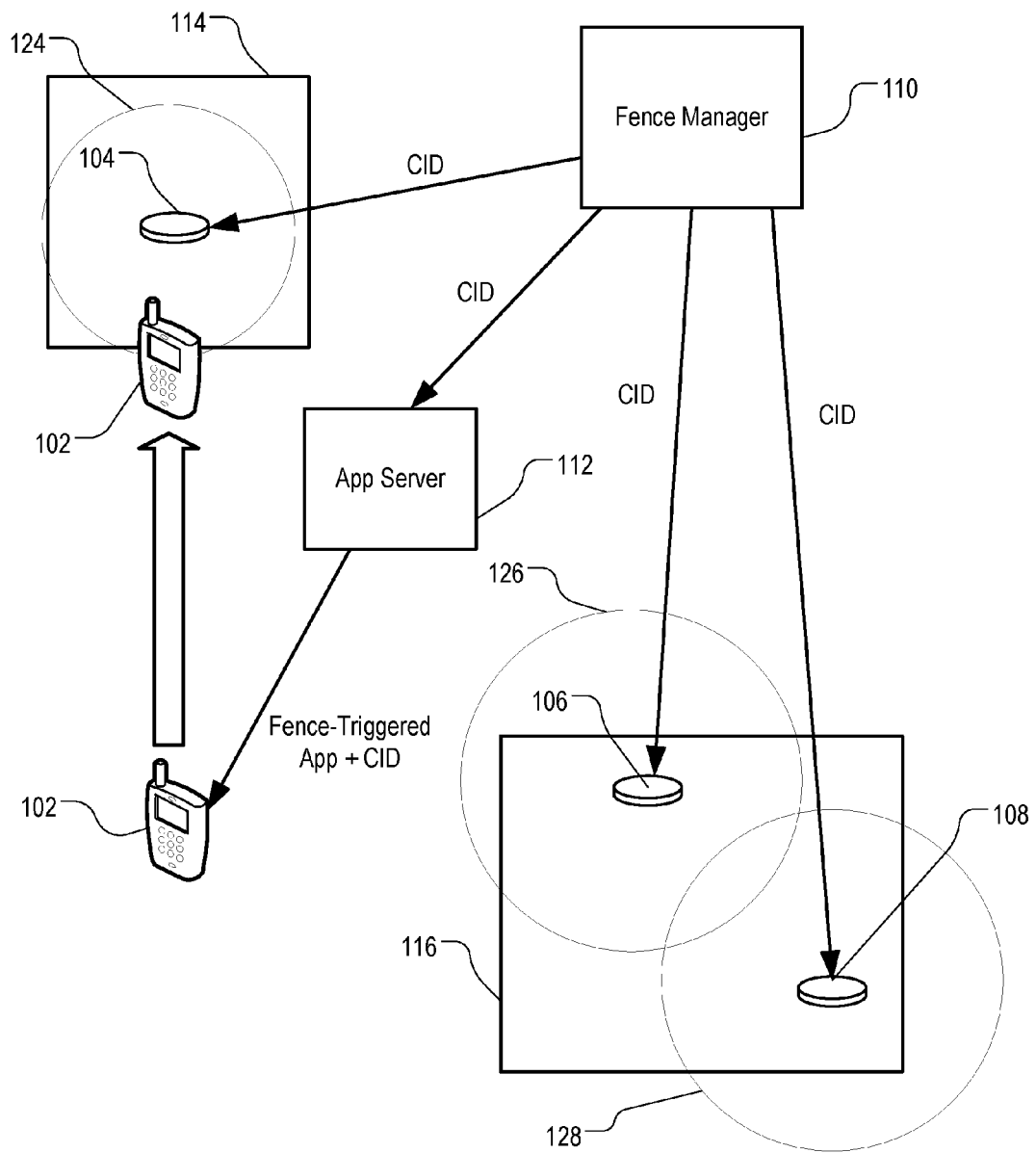
FIG. 1 is a diagram illustrating an exemplary category-based fence.

FIG. 1 is a diagram illustrating an exemplary category-based fence. Mobile device 102 can be an exemplary electronic device (e.g., a tablet computer, a laptop computer, a smart phone, or a wearable computing device) programmed to execute an application program when mobile device 102 enters a category-based fence. The category-based fence can be defined by a group of signal sources including, for example, signal sources 104, 106, and 108. Each of signal sources 104, 106, and 108 can be a wireless beacon configured to broadcast an identifier through one or more pre-specified communication channels. In some implementations, signal sources 104, 106, and 108 are radio frequency (RF) transmitters. For example, signal sources 104, 106, and 108 can be Institute of Electrical and Electronics Engineers (IEEE) 802.11u compliant (Wi-Fi™) beacons. In some implementations, signal sources 104, 106, and 108 can be Bluetooth™ low energy (BLE) or a near field communication (NFC) beacons. Signal sources 104, 106, and 108 can have a same device type or different device types. Each of signal sources 104, 106, and 108 can broadcast an identifier on one or more specified channels.

The identifier broadcast by each of signal sources 104, 106, and 108 can be programmable. At least a portion of the identifier can be a universally unique identifier (UUID). The UUID can be a number having a specified size (e.g., 128 bits). The UUID can be unique for a group of signal sources (e.g., signal sources 104, 106, and 108), and uniform for each individual signal source 104, 106, or 108 in the group. The UUID can be programmed through category-based fence manager 110. Category-based fence manager 110 can be a computing device (e.g., a server) configured to generate or otherwise obtain the UUID and associate the generated UUID with a category of entities. A UUID associated with a category will be referred to as a category identifier (CID).

Category-based fence manager 110 can define the category of entities associated with the UUID as a category of organizations having one or more physical presences. In some implementations, the category can be a generalization of a type of organizations. For example, category-based fence manager 110 can define a category "grocery stores," "gas stations," or "museums." In some implementations, the category can represent a specific organization. For example, category-based fence manager 110 can define a category "University of California" or "Century 12 Movie Theaters." In some implementations, category-based fence manager 110 can cause the CIDs to be stored on signal sources 104, 106, and 108, to be broadcast as at least a portion of an identifier broadcast by signal sources 104, 106, and 108.

Category-based fence manager 110 can provide the CID to application server 112. Application server 112 can be a computing device associating an application program, e.g., a program that displays an advertisement for a group of entities, with the corresponding CID. The application program can be a fence-triggered program, where an entry into or exit from a category-based fence causes the program to be activated or deactivated. Application server 112 can then provide the application program and associated CID to mobile device 102.

Signal sources 104, 106, and 108 can be placed at different and discrete venues. For example, signal source 104 can be placed at venue 114. Signal sources 106 and 108 can be placed at venue 116. Each of signal sources 104, 106, and 108 can have a coverage area, e.g., coverage areas 124, 126, and 128, respectively. Each of coverage areas 124, 126, and 128 can be an area surrounding the respective signal source within which the identifier as broadcast by the respective signal source can be reliably detected by mobile device 102. The size of each of coverage areas 124, 126, and 128 can correspond to communication ranges of signal sources 104, 106, and 108, respectively. Coverage areas 124, 126, and 128 are shown as circular areas in FIG. 1. In various implementations, coverage areas 124, 126, and 128 may have shapes other than circles, e.g., irregulars, as limited by physical structures of venues 114 and 116. Coverage areas 124, 126, and 128 need not be identical. Coverage areas 124, 126, and 128 can be sufficiently small to be discrete. For example, coverage areas 124, 126, and 128 limited by the communication ranges of their signal sources to within the confines of venues 114 and 116, respectively, such that mobile device 102 can detect signal source 104 at venue 114, but cannot detect signal source 106 or 108 at venue 114. A category-based fence can be operative when at least one of signal sources 104, 106, or 108 starts to broadcast the identifier including the CID.

In some implementations, category-based fence manager 110 can publish a list of categories and corresponding CIDs. Table 1 below illustrates a portion of an exemplary list published by category-based fence manager 110.

TABLE 1

| Category | CID |
| --- | --- |
| Grocery stores | fd896290-6e29-11e2-bcfd-0800200c9a66 |
| ABC Stores | 787520c0-6e2a-11e2-bcfd-0800200c9a66 |

Thereafter, a category-based fence can be expanded by adding a new signal source broadcasting the CID of the category. For example, when a chain "ABC Stores" opens a new "ABC Store" at a location, a new signal source programmed to broadcast the corresponding CID as published in Table 1 can be placed at the new location. By adding the new signal source and placing the new signal source at a given venue, the category-based fence can be expanded without having to submit a location of the given venue to application server 112 for download by mobile device 102.

Mobile device 102 can acquire the fence-triggered application program, as well as the associating CID, from application server 112. Mobile device 102 can detect an entry into the category-based fence when a wireless subsystem (e.g., a wireless processor and memory storing software controlling the wireless processor) changes states from (1) detecting no signal source of the category-based fence to (2) detecting one or more sources of the category-based fence, e.g., signal source 104, in M scans, where M is a pre-specified entry threshold number. Mobile device 102 can detect an exit from the category-based fence when a wireless subsystem changes states from (1) detecting one or more sources of the category-based fence to (2) detecting no signal source of the category-based fence, e.g., any of signal source 104, 106, or 108, in N scans, where N is a pre-specified exit threshold number. In various implementation, the entry threshold M can be greater than, the same as, or less than the exit threshold N. The detection can include receiving a CID from signal source 104, 106, or 108.

In some implementations, the detection of entry or exit can be performed by the wireless subsystem while an application subsystem (e.g., an application processor and memory storing software controlling the application processor) of mobile device 102 is in a "sleep" (e.g., power saving) mode. Upon detecting the entry or exit, the wireless subsystem can activate the application subsystem and notify the application subsystem, including providing the CID to the application subsystem. The application subsystem can then activate or deactivate the fence-triggered application program based on the CID.

For example, mobile device 102 can enter venue 114. Upon the entry, the wireless subsystem of mobile device 102 can detect a signal including an identifier from signal source 104. The wireless subsystem of mobile device 102 can determine that at least a portion of the identifier matches a CID registered at the wireless subsystem of mobile device 102. The wireless subsystem of mobile device 102 can then notify an application subsystem of mobile device 102, which, in turn, can activate (e.g., execute) the fence-triggered application program. Mobile device 102 can activate the fence-triggered application program in any one of venue 114 or venue 116, even when venue 114 and venue 116 are far apart from one another. In addition, mobile device 102 can activate the fence-triggered application program in any one of venue 114 or venue 116 even when mobile device 102 cannot determine an estimated geographic location of mobile device 102, e.g., due to lack of GPS signals indoors, or due to a positioning subsystem of mobile device 102 being turned off to save power.

Figure 2:
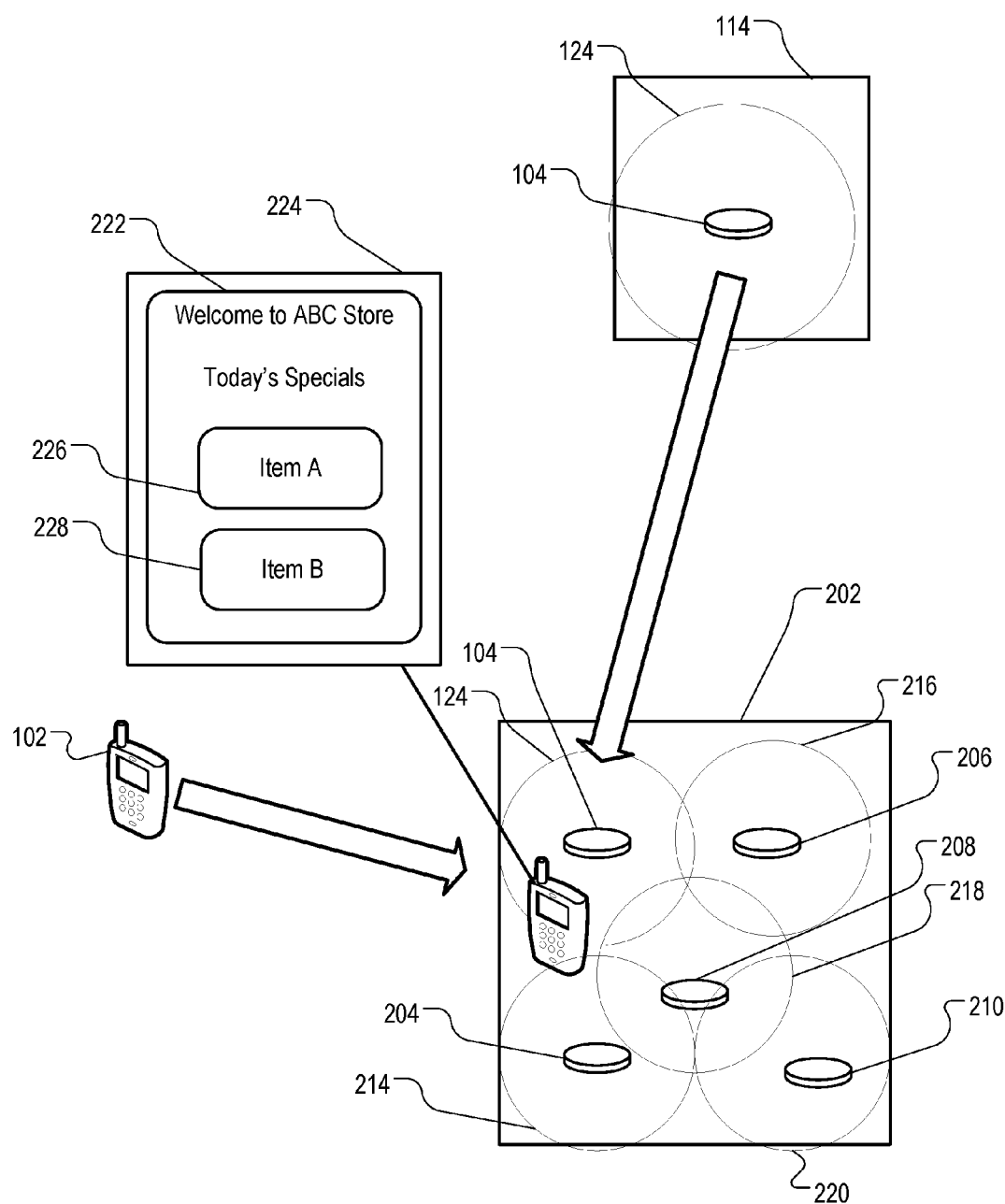
FIG. 2 is a diagram illustrating a dynamic modification of an exemplary category-based fence.

FIG. 2 is a diagram illustrating a dynamic modification of an exemplary category-based fence. In the exemplary category-based fence, initially, signal source 104 having coverage area 124 can be placed at venue 114. Signal source 104 can broadcast a CID, for example, the CID associated with category "ABC Stores" of Table 1. The category "ABC Stores" can be a store chain including multiple physical stores, one of which is located at venue 114.

The physical store at venue 114 can move to new venue 202. Venue 202 can be an outdoor or indoor place larger than venue 114 and sufficiently far away from venue 114 such that mobile device 102, if located at venue 202, cannot detect a signal from signal source 104 when signal source 104 is located at venue 114.

The fence based on category "ABC Stores" can change due to the relocation of the physical store and increase in venue size. A first change to the category-based fence, corresponding to the change of a store location, can be facilitated by moving signal source 104 from venue 114 to venue 202. A second change to the category-based fence, corresponding to the increase in venue size, can be facilitated by adding more signal sources. For example, signal source 104 can be a low-energy RF device (e.g., a BLE beacon having no more than 10 milliwatts (mW) transmission power). Coverage area 124 of signal source 104 can be sufficient to cover venue 114 but insufficient to cover the entirety of venue 202. Additional signal sources 204, 206, 208, and 210 can be added to the category-based fence. Signal sources 204, 206, 208, and 210 can be low-energy RF devices. Coverage areas 124, 214, 216, 218, and 220 of signal sources 104, 204, 206, 208, and 210, respectively, when combined, may be sufficient to cover the entirety of venue 202 substantially. Signal sources 104, 204, 206, 208, and 210 can each store a CID associated with the category "ABC Stores" and be configured to broadcast the CID as a beacon signal.

The changed fence based on category "ABC Stores" can be operative when signal sources 104, 204, 206, 208, and 210 start broadcasting the CID at new venue 202. When mobile device 102 enters venue 202, mobile device 102 can detect a signal from any one of signal sources 104, 204, 206, 208, and 210, and upon the detection, trigger an application program associated with the CID. The trigged application program can be the same as the application program mobile device 102 would have triggered at venue 114 when mobile device 102 could detect the signal from signal source 104, when signal source 104 was located at venue 114. For example, the application program previous triggered by mobile device 102 at venue 114 and now triggered by mobile device 102 at venue can cause user interface 222 to be displayed on screen 224 of mobile device 102. User interface 222 can be a user interface associated with the category "ABC Stores" no matter where a specific store is physically located. For example, user interface 222 can include a "Welcome to ABC Store" message, and promotion items 226 and 228, that are universal to all ABC stores.

Exemplary Device Components

Figure 3:
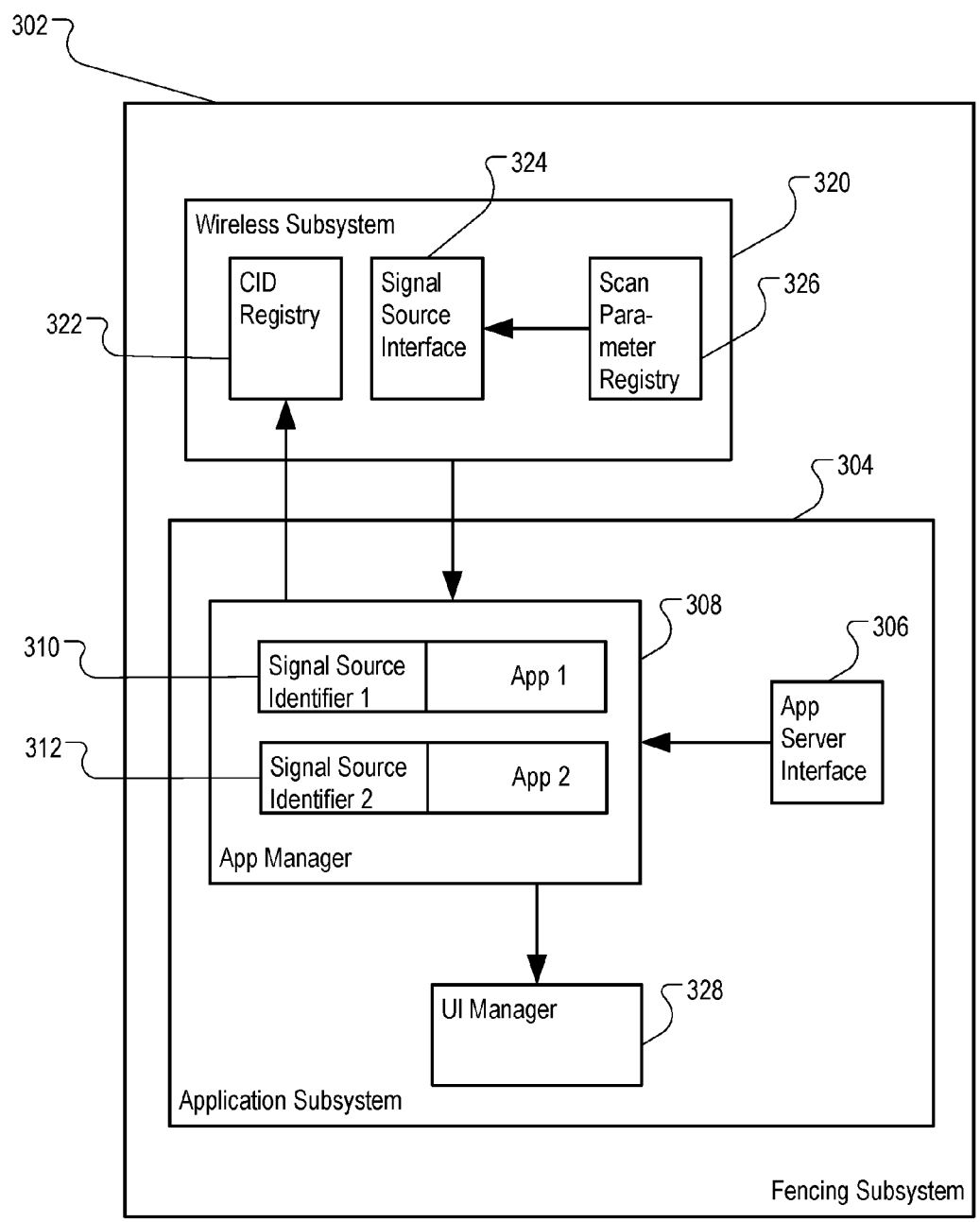
FIG. 3 is a block diagram illustrating components of an exemplary category-based fencing subsystem of a mobile device.

FIG. 3 is a block diagram illustrating components of exemplary category-based fencing subsystem 302 of mobile device 102. Category-based fencing subsystem 302 can include application subsystem 304. Application subsystem 304 can include one or more processors (e.g., application processors) configured to execute an application program. Application subsystem 304 can include application server interface 306. Application server interface 306 is a component of application subsystem 304 that includes hardware and software and is configured to communicate with an application server (e.g., application server 112) and receive (e.g., by download) one or more application programs. Each application program received through application server interface 306 can be associated with a CID, and configured to be triggered by entry into or exit from a category-based fence associated with the CID.

Application subsystem 304 can include application manager 308. Application manager 308 can be a component of application subsystem configured to store, activate, or deactivate fence-triggered application programs. For example, application manager 308 can store and manage fence-triggered application programs 310 and 312. Each of fence-triggered application programs 310 and 312 can be associated with a corresponding CID and a specification. The specification can provide that fence-triggered application programs 310 or 312 should be activated or deactivated when mobile device 102 enters into or exits from a corresponding category-based fence.

Application manager 308 can register the CID with wireless subsystem 320. Wireless subsystem 320 is a component of category-based fencing subsystem 302 that can include an antenna, a wireless processor (e.g., a baseband processor), and software or firmware. Wireless subsystem 320 can include CID registry 322. CID registry 322 can store one or more CIDs for scanning. Wireless subsystem 320 can include signal source interface 324. Signal source interface 324 is a component of wireless subsystem 320 configured to scan one or more communication channels for signals from signal sources, to detect signal source identifiers from the signals detected in the scans, and to match the detected signal source identifiers with the CIDs stored in CID registry 322. Wireless subsystem 320 can include scan parameter registry 326 configured to store an entry threshold (M), an exit threshold (N), or both. Signal source interface 324 can generate a notification when a signal source identifier matching one of the CID is detected in at least M scans, or is undetected in at least N scans. Wireless subsystem 320 can provide the notification to application subsystem 304. The notification can include one or more CIDs for which a match is detected.

Upon receiving the notification, application subsystem 304 can determine whether to activate (e.g., execute) or to deactivate (e.g., exit from execution) application program 310 or 312. When an application program is activated, the application program can present a user interface item through user interface manager 328. User interface manager 328 can be a component of mobile device 102 configured to interact with a user, e.g., by displaying content to the user and receiving touch or voice input from the user. The user interface item can be a visual item (e.g., a welcome message displayed on a screen), an audio item (e.g., a synthesized or recorded voice message), or a physical item (e.g., vibration of mobile device 102 for reminding a user).

Exemplary Procedures

Figure 4:
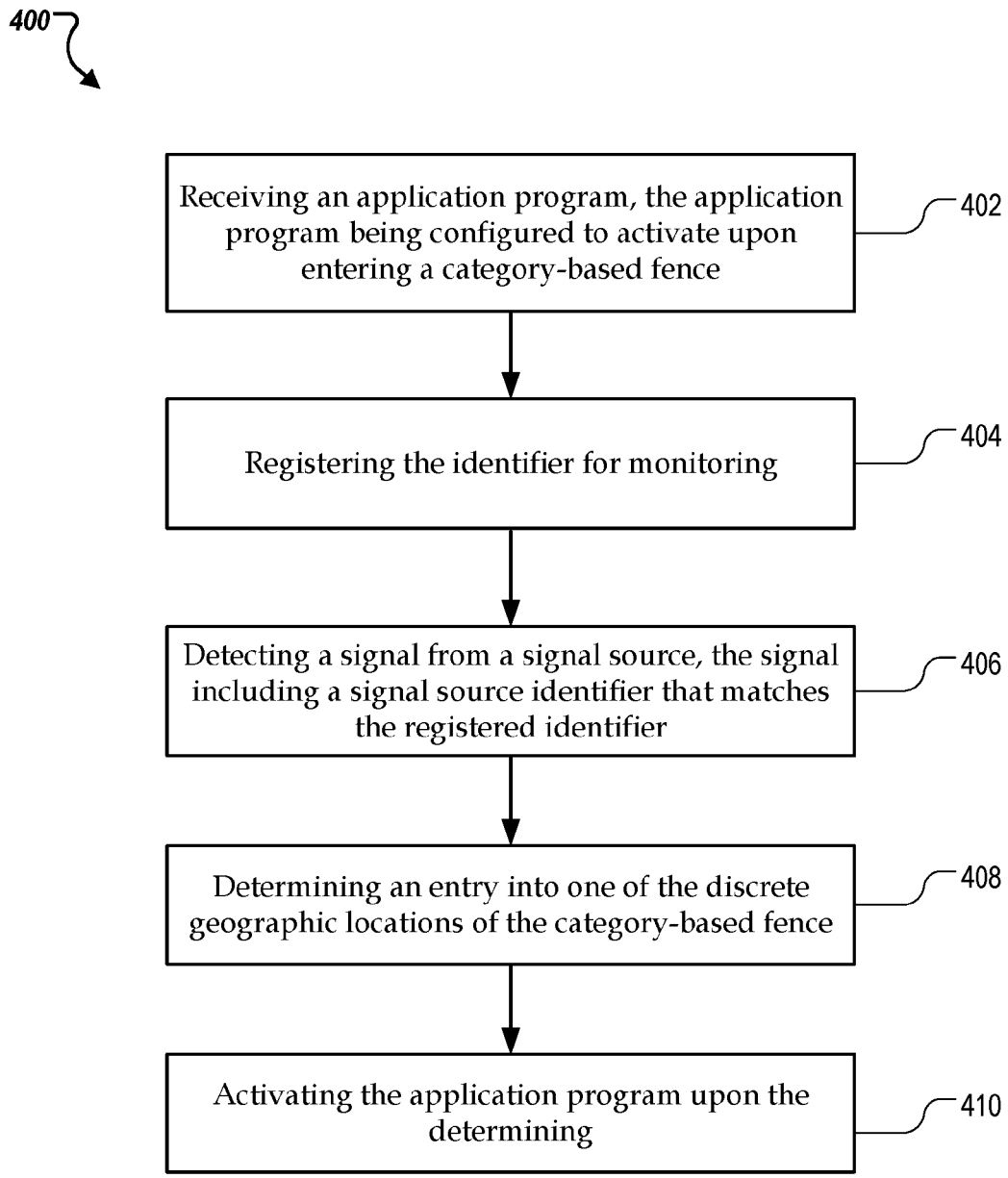
FIG. 4 is a flowchart of an exemplary procedure of triggering an application program using category-based fencing based on a category identifier.

FIG. 4 is a flowchart of exemplary procedure 400 of triggering an application program using category-based fencing based on a category identifier. Procedure 400 can be performed by mobile device 102.

Mobile device 102 can receive (402) an application program from an application server through application server interface 306. The application program can be a fence-triggered application program to be activated upon entering a category-based fence. The category-based fence can be defined by, and correspond to, multiple signal sources. The category-based fence can be associated with an identifier (e.g., a CID) of a signal source group that includes the signal sources. The identifier can include a UUID unique to the group but shared by each signal source in the group and broadcast by the corresponding signal source as beacon signals.

The category-based fence can be distributed in multiple discrete geographic locations. Each discrete geographic location can correspond to one or more of the signal sources in the group. Each signal source of the signal source group can be a low energy signal transmitter (e.g., a BLE beacon or an NFC beacon) having a transmission power that is below a transmission power threshold, or a wireless beacon based on IEEE 802.11u technical standard for mobile wireless communication.

Mobile device 102 can register (404) the identifier associated with the category-based fence for monitoring using application manager 308. Registering the identifier can include storing the identifier in CID registry 322 of wireless subsystem 320 of mobile device 102.

Mobile device 102 can detect (406) a signal from a signal source using signal source interface 324. The signal can include a signal source identifier that matches the registered identifier. Detection of the signal can be based on an entry threshold.

Mobile device 102 can determine (408), based on the match between the signal identifier detected by signal source interface 324 and the CID stored in CID registry 322, that mobile device 102 has entered one of the discrete geographic locations of the category-based fence. Determining that mobile device 102 has entered one of the discrete geographic locations can further be based on determining, using application manager 308 and one or more location processors of mobile device 102, that mobile device 102 has transitioned from an outdoor state to an indoor state. Determining the transition can include, for example, determining that mobile device 102 has lost reception of GPS signals.

Mobile device 102 can activate (410) the application program using application manager 308 upon determining that mobile device 102 has entered one of the discrete geographic locations. In some implementations, after determining that mobile device 102 has entered one of the discrete geographic locations, mobile device 102 can perform operations for detecting a fence exit. Mobile device 102 can scan communication channels for signal sources, and determine one or more signal source identifiers from the signals received in each scan. Mobile device 102 can determine that, for at least a threshold number of scans, none of the one or more signal source identifiers received in each scan matches a registered identifier. Mobile device 102 can then determine that mobile device 102 has exited the category-based fence and exit the application program.

Figure 5:
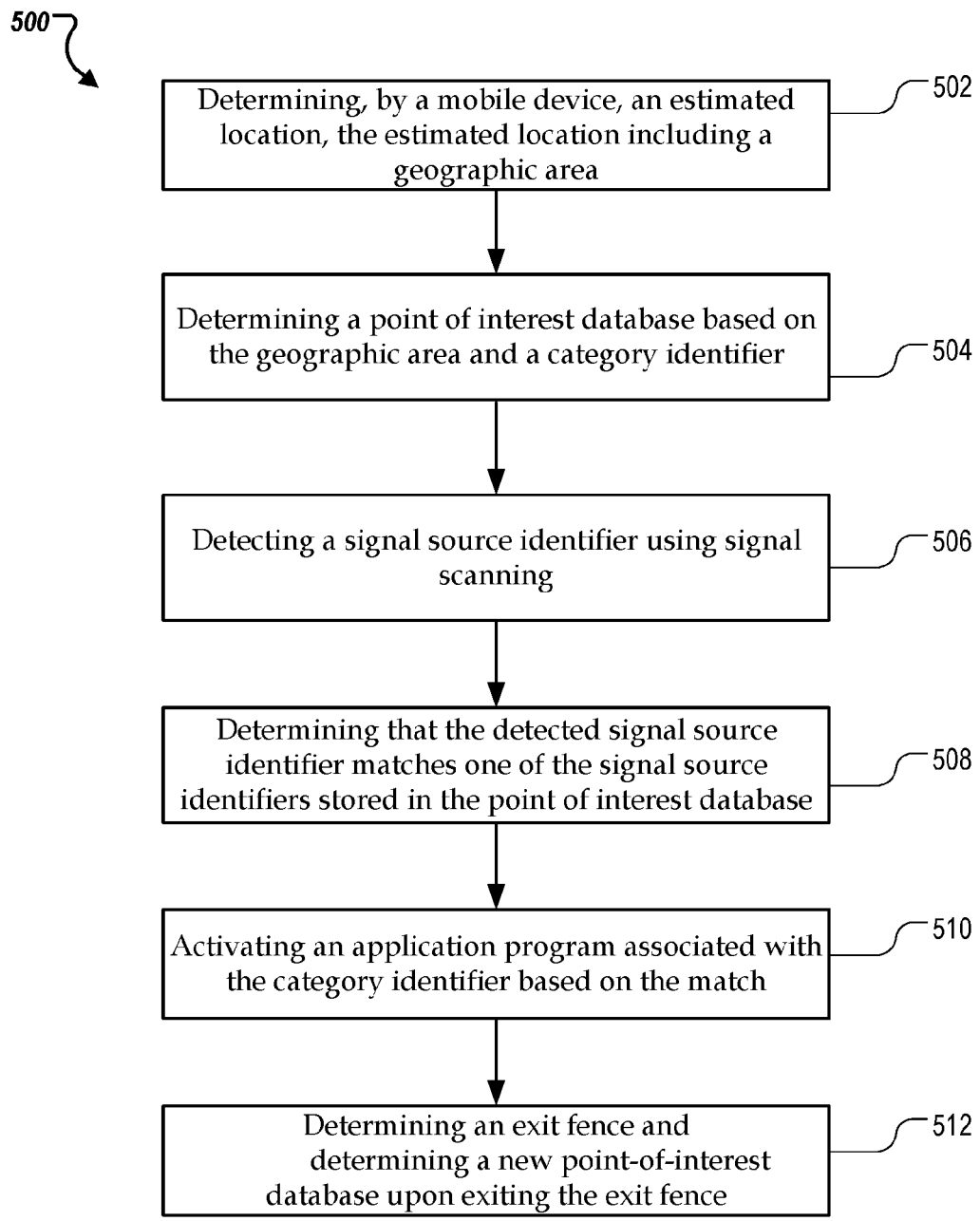
FIG. 5 is a flowchart of an exemplary procedure of triggering an application program using category-based fencing based on a point-of-interest list.

FIG. 5 is a flowchart of exemplary procedure 500 of triggering an application program using category-based fencing based on a point-of-interest list. Procedure 500 can be performed by mobile device 102.

Mobile device 102 can determine (502) an estimated location of mobile device 102. The estimated location can include a geographic area, e.g., a city, or a geographic area X kilometers in diameter. Mobile device 102 can determine the estimated location using GPS signals or wireless triangulation.

Mobile device 102 can determine (504) a point of interest database based on the geographic area and a category identifier (CID). The CID can be associated with a group of signal sources. Mobile device 102 can specify the category identifier based on a user input category (e.g., "grocery store") and a published list of categories and corresponding CIDs. The point of interest database can store signal source identifiers of signal sources in the group. The signal sources in the group can be wireless beacons placed at discrete locations within the geographic area. The CID can be shared by the signal sources in the group and broadcast by the signal sources. In addition, each signal source can broadcast individual identifiers with the CID. The individual identifiers and the CID can form beacon broadcast payloads of the signal sources.

Mobile device 102 can detect (506) a signal source identifier by channel scanning. Channel scanning can include tuning into frequency channels available for the signal sources using wireless subsystem 320 of mobile device 102, determining whether a signal can be received in a channel, and when a signal is received, and determining whether a signal source identifier is represented in the signal.

Mobile device 102 can determine (508) that at least a portion the detected signal source identifier matches the CID stored in the point of interest database. The portion can be a UUID portion of the signal source identifier. Mobile device 102 can then activate (510) an application program associated with the CID based on the match.

In some implementations, mobile device 102 can determine (512) an exit fence. The exit fence can be a category-based fence surrounding the geographic area. Mobile device 102 can then determine an exit from the exit fence has occurred, e.g., by determining, using GPS signals, that mobile device 102 is no longer located at the city where mobile device 102 was originally located. Upon determining the exit, mobile device 102 can determine a new point-of-interest database storing a new list of signal source identifiers. For example, when mobile device 102 has determined that mobile device 102 has moved from a first city to a second city, mobile device 102 can register a list of signal source identifiers corresponding to a category "grocery store" located in the second city, and scan for the signal source identifiers in the new list.

Figure 6:
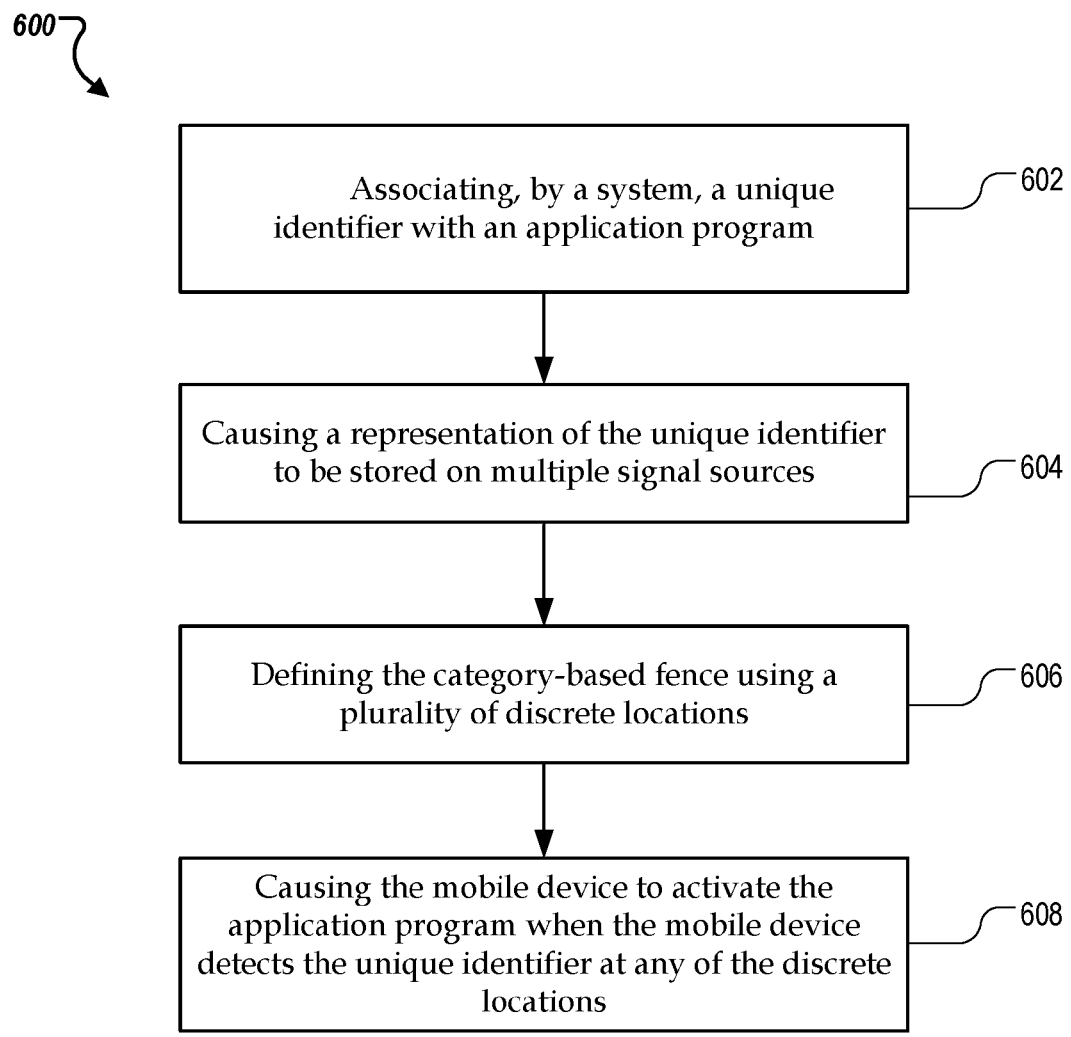
FIG. 6 is a flowchart of an exemplary procedure of creating a category-based fence.

FIG. 6 is a flowchart of exemplary procedure 600 of creating a category-based fence. Procedure 600 can be performed by a system including one or more processors, e.g., a system that includes category-based fence manager 110 or application server 112 or both.

The system can associate (602) a unique identifier with an application program. The unique identifier (e.g., CID) can represent a category-based fence. The application program can be activated on mobile device 102 when the mobile device 102 enters the category-based fence.

The system can cause (604) a representation of the unique identifier to be stored on multiple signal sources. The signal sources can be low energy signal transmitters having a transmission power that is below a transmission power threshold or a wireless beacon based on IEEE 802.11u technical standard for mobile wireless communication.

The system can define (606) the category-based fence using multiple discrete locations. Defining the category-based fence can include causing the signal sources to be distributed to the discrete locations. The locations are discrete, or not connected to one another, when a designated communication range of a first signal source located at a first location does not reach a second location where a second signal source is located. The system can define the category-based fence independent of a latitude or longitude coordinate. For example, the system can define the category-based fence without using of a latitude or longitude coordinate of each discrete location.

The system can cause (608) mobile device 102 to activate the application program when mobile device 102 detects the unique identifier at any of the discrete locations. Causing mobile device 102 to activate the application program can include providing the application program to mobile device 102 in association with the unique identifier, and designate the application program as an application program to be triggered when mobile device 102 enters or exits the category-based fence.

In some implementations, the system can expand the category-based fence by adding a new discrete location. Adding the new discrete location can include causing an additional signal source to store the unique identifier specific to the category, and causing the additional signal source to be placed at the new discrete location and to broadcast the unique identifier.

Exemplary System Architecture

Figure 7:
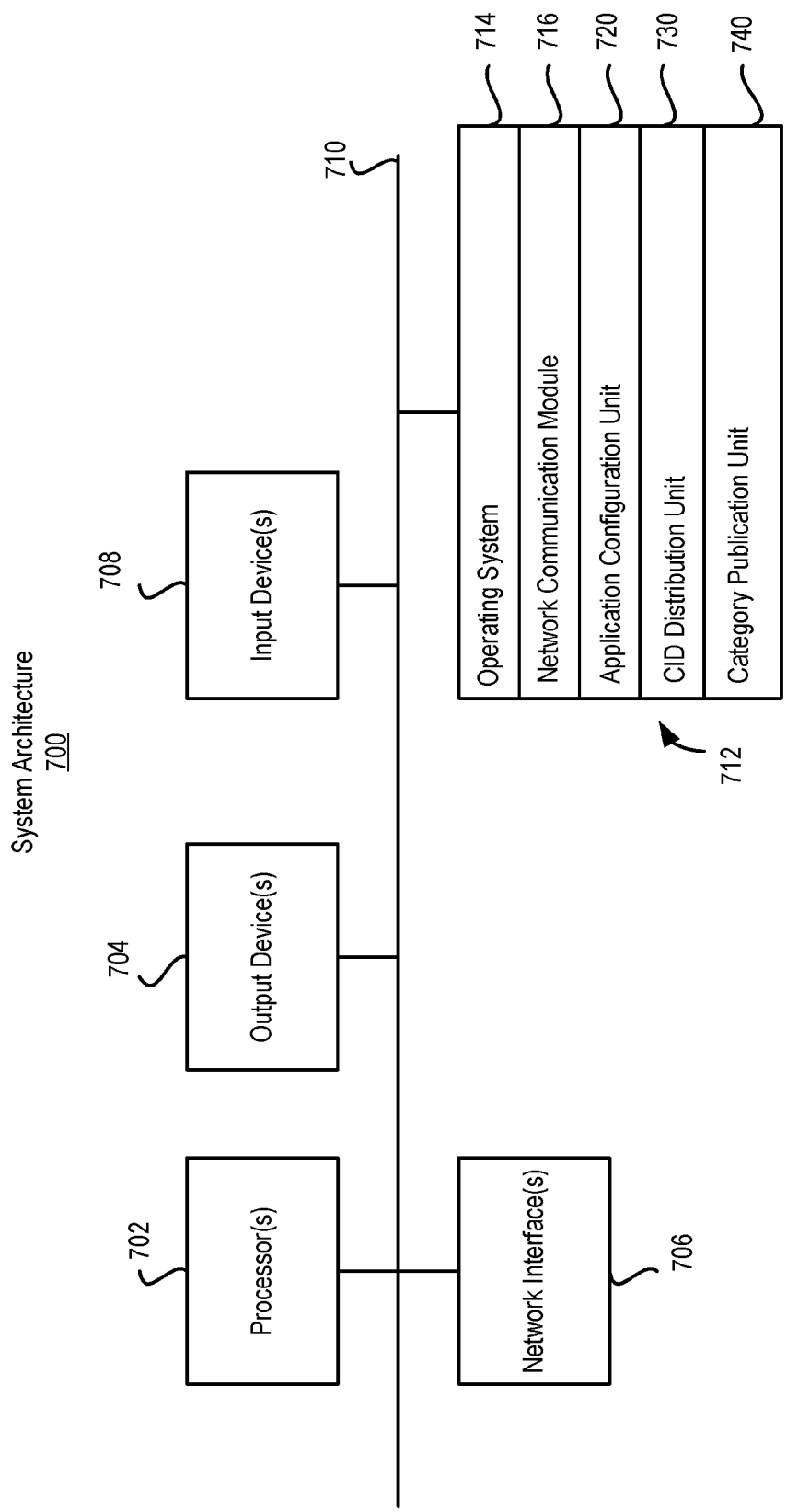
FIG. 7 is a block diagram of an exemplary system architecture for implementing the features and operations of creating a category-based fence.

FIG. 7 is a block diagram of exemplary system architecture 700 for implementing the features and operations of creating a category-based fence. Other architectures are possible, including architectures with more or fewer components. In some implementations, architecture 700 includes one or more processors 702 (e.g., dual-core Intel® Xeon® Processors), one or more output devices 704 (e.g., LCD), one or more network interfaces 706, one or more input devices 708 (e.g., mouse, keyboard, touch-sensitive display) and one or more computer-readable media 712 (e.g., RAM, ROM, SDRAM, hard disk, optical disk, flash memory, etc.). These components can exchange communications and data over one or more communication channels 710 (e.g., buses), which can utilize various hardware and software for facilitating the transfer of data and control signals between components.

The term "computer-readable medium" refers to any medium that participates in providing instructions to processor 702 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 712 can further include operating system 714 (e.g., Mac OS® server, Windows Server®), network communication module 716, Application configuration unit 720, CID distribution unit 730, and category publication unit 740. Application configuration unit 720 can include instructions for causing processor 702 to obtain CIDs (by generating the CIDs or receiving the CIDs from a UUID source) and associating each CID with an application program. CID distribution unit 730 can include instructions for causing processor 702 to provide the CIDs to one or more signal sources for storing on the signal sources. Category publication unit 740 can include instructions for causing processor 702 to publish one or more lists of categories and corresponding CIDs to allow a category-based fence to be dynamically expanded or changed. Operating system 714 can be multi-user, multiprocessing, multitasking, multithreading, real time, etc. Operating system 714 performs basic tasks, including but not limited to: recognizing input from devices 708 and providing output to devices 704; keeping track and managing files and directories on computer-readable media 712 (e.g., memory or a storage device); controlling peripheral devices; and managing traffic on the one or more communication channels 710. Network communications module 716 includes various components for establishing and maintaining network connections (e.g., software for implementing communication protocols, such as TCP/IP, HTTP, etc.).

Architecture 700 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer.

Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

Exemplary Mobile Device Architecture

Figure 8:
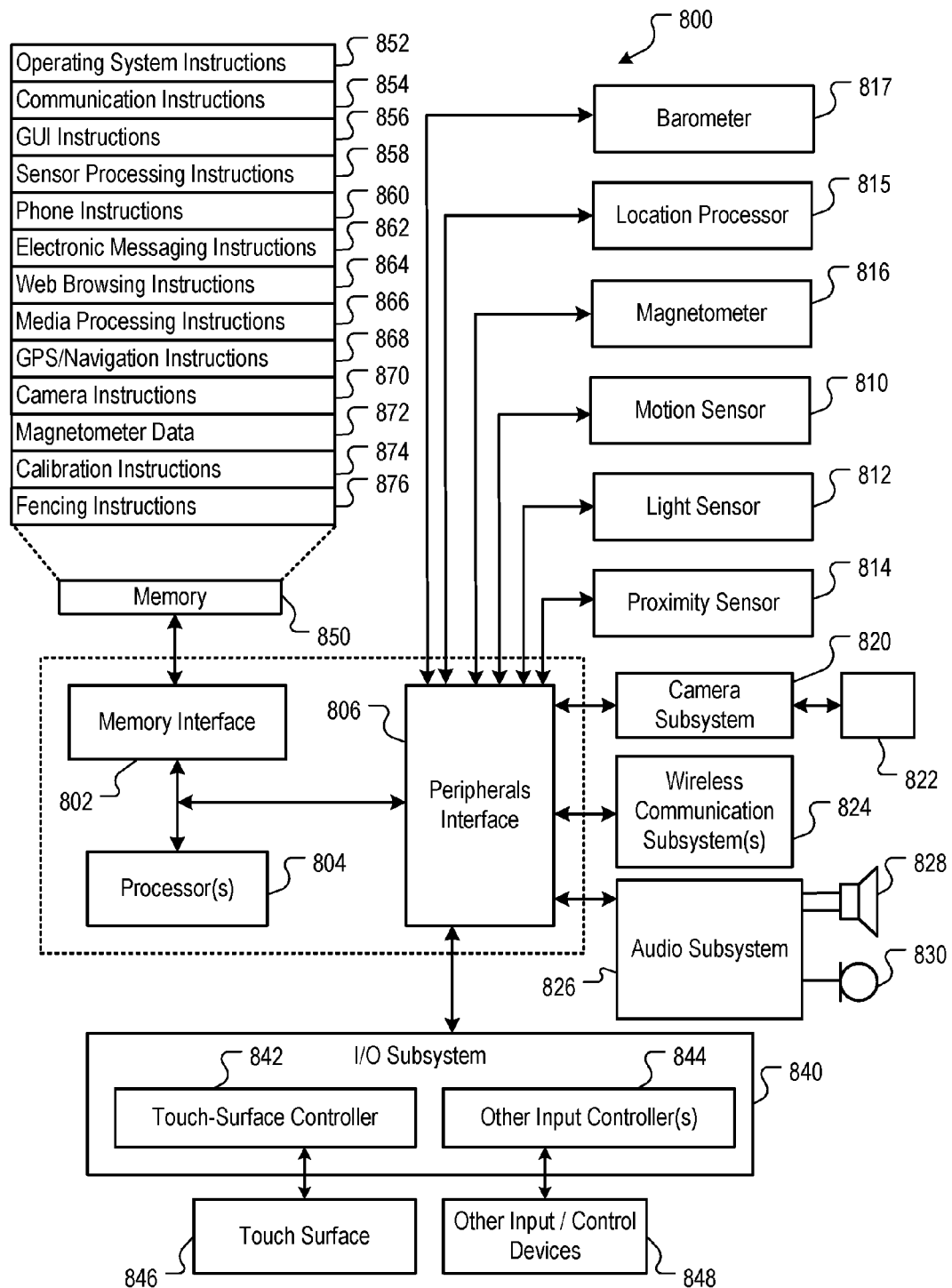
FIG. 8 is a block diagram illustrating an exemplary device architecture of a mobile device implementing the features and operations of category-based fence.

FIG. 8 is a block diagram illustrating exemplary device architecture 800 of a mobile device implementing the features and operations of category-based fence. A mobile device (e.g., mobile device 102) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in mobile device 102, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMax™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to mobile device 102 on or off. The user may be able to customize a functionality of one or more of the buttons. The touch surface 846 can, for example, also be used to implement virtual or soft buttons and/or a keyboard.

In some implementations, mobile device 102 can present recorded audio and/or video files, such as MP3, AAC, and MPEG files. In some implementations, mobile device 102 can include the functionality of an MP3 player. Mobile device 102 may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store fencing instructions 876 that, when executed, can cause processor 804 to perform operations of generating a fence-triggered application program or requesting a fence-triggered application program from a server, managing the fence-triggered application program, and activating or deactivating the fence-triggered application program upon notification that mobile device 102 has entered or exited a category-based fence.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
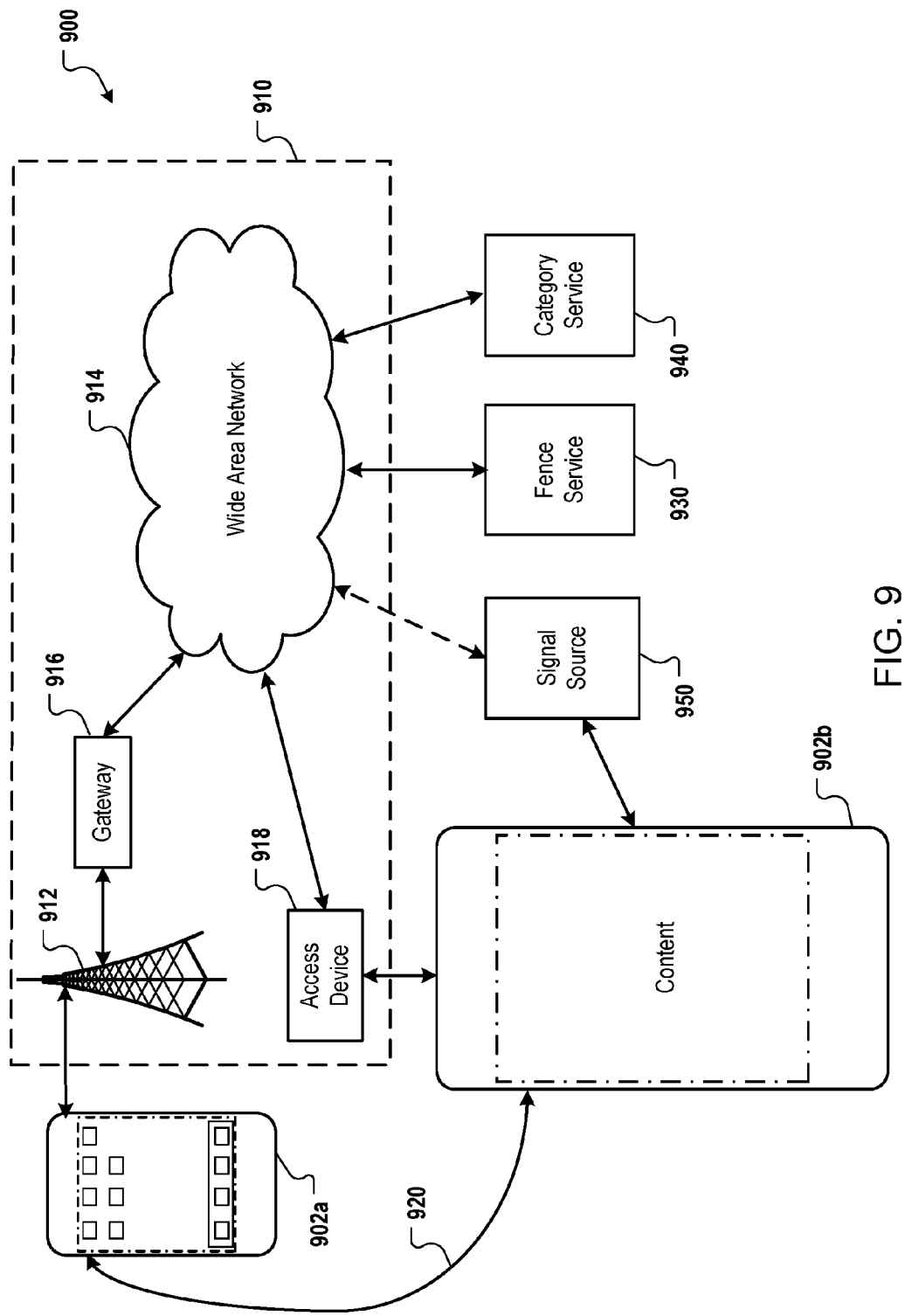
FIG. 9 is a block diagram of an exemplary network operating environment for the mobile devices implementing the features and operations of category-based fence.

FIG. 9 is a block diagram of exemplary network operating environment 900 for the mobile devices implementing the features and operations of category-based fence. Mobile devices 902a and 902b can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902a and 902b can be mobile device 102.

In some implementations, both voice and data communications can be established over wireless network 912 and the access device 918. For example, mobile device 902a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902b can place and receive phone calls, send and receive e-mail messages, and retrieve electronic documents over the access device 918 and the wide area network 914. In some implementations, mobile device 902a or 902b can be physically connected to the access device 918 using one or more cables and the access device 918 can be a personal computer. In this configuration, mobile device 902a or 902b can be referred to as a "tethered" device.

Mobile devices 902a and 902b can also establish communications by other means. For example, wireless device 902a can communicate with other wireless devices, e.g., other mobile devices, cell phones, etc., over the wireless network 912. Likewise, mobile devices 902a and 902b can establish peer-to-peer communications 920, e.g., a personal area network, by use of one or more communication subsystems, such as the Bluetooth™ communication devices. Other communication protocols and topologies can also be implemented.

The mobile device 902a or 902b can, for example, communicate with one or more services 930 and 940 over the one or more wired and/or wireless networks. For example, one or more category-based fence services 930 can provide fence-triggered application programs and associated CIDs to mobile devices 902a and 902b. Category service 940 can provide published categories and corresponding CIDs to mobile devices 902a and 902b such that a user of mobile devices 902a and 902b can add a signal source to a fence of a category by storing the CID corresponding to the category to the signal source, or modify a category of a signal source by changing the CID stored on the signal source.

Mobile device 902a or 902b can communicate with one or more signal sources 950. Each signal source 950 can be a wireless beacon configured to broadcast a signal source identifier. The signal source identifier can include a CID. In some implementations, each signal source 950 can communicate to other devices through wide area network 914 or facilitate communication between mobile device 902a or 902b with the other devices. In some implementations, each signal source 950 can be independent from a communications network, and function solely as beacons of category-based fences.

Mobile device 902a or 902b can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

A number of implementations of the invention have been described. Nevertheless, it will be understood that various modifications can be made without departing from the spirit and scope of the invention.

What is claimed is:

1. A method comprising:
   detecting, by a mobile device located at a first location, a first signal from a first signal source, the first signal including a first signal source identifier that matches a category identifier that is associated with a category-based fence, the category-based fence being a location-agnostic virtual fence corresponding to a group of signal sources located at a plurality of locations;
   in response to detecting the first signal from the first signal source, triggering a function of the mobile device, the function being associated with the category-based fence and a specification, the specification specifying that the function is to be activated in response to entry into the category-based fence by the mobile device;
   detecting, by the mobile device located at a second location that is different from the first location, a second signal from a second signal source, the second signal including a second signal source identifier that matches the category identifier; and
   in response to detecting the second signal from the second signal source, triggering the function associated with the category-based fence on the mobile device at the second location.

2. The method of claim 1, wherein each signal source of the group is at least one of:
   a signal transmitter having a transmission power that is below a transmission power threshold, or
   a wireless access point based on IEEE 802.11x technical standard for mobile wireless communication.

3. The method of claim 2, wherein each signal source is a Bluetooth™ low energy (BLE) device or a near field communication (NFC) device.

4. The method of claim 1, comprising adding a new signal source to the category-based fence by programming the new signal source to broadcast at least a portion of the category identifier.

5. The method of claim 1, comprising determining that the mobile device entered the first location or the second location, wherein the determining is based on determining that the mobile device has transitioned from an outdoor state to an indoor state.

6. The method of claim 5, comprising, after determining that the mobile device has entered the first location or the second location:
   scanning a plurality of communication channels for signal source broadcasts;
   determining that, for at least a threshold number of scans, none of one or more signal source identifiers received in each scan matches the category identifier;
   determining that the mobile device has exited the category-based fence; and then
   disabling the function.

7. A method, comprising:
   associating, by a system comprising one or more processors, a category identifier with a program, the category identifier representing a category-based fence, the category-based fence being a location-agnostic virtual fence;
   associating the category identifier with a plurality of signal sources, including causing a representation of the category identifier to be stored on the plurality of signal sources;
   defining the category-based fence at a plurality of discrete locations, including causing the signal sources to be placed at the discrete locations, wherein a communication range of a first signal source located at a first location does not reach a second location where a second signal source is placed; and
   providing the program and associated category identifier to a mobile device to activate the program at any of the discrete locations.

8. The method of claim 7, comprising expanding the category-based fence by adding a new discrete location, wherein adding the new discrete location comprises causing an additional signal source to be placed at the new discrete location, the additional signal source storing the representation of the category identifier.

9. The method of claim 7, wherein the category-based fence is defined independent of a latitude or longitude coordinate.

10. A mobile device comprising:
    one or more processors; and
    a non-transitory storage device storing instructions that, when executed by the one or more processors, cause the one or more processors to perform operations comprising:
    detecting, by the mobile device located at a first location, a first signal from a first signal source, the first signal including a first signal source identifier that matches a category identifier that is associated with a category-based fence, the category-based fence being a location-agnostic virtual fence corresponding to a group of signal sources located at a plurality of locations;
    in response to detecting the first signal from the first signal source, triggering a function of the mobile device, the function being associated with the category-based fence and a specification, the specification specifying that the function is to be activated in response to entry into the category-based fence by the mobile device;
    detecting, by the mobile device located at a second location that is different from the first location, a second signal from a second signal source, the second signal including a second signal source identifier that matches the category identifier; and
    in response to detecting the second signal from the second signal source, triggering the function associated with the category-based fence on the mobile device at the second location.

11. The mobile device of claim 10, wherein each signal source of the group is at least one of:
    a signal transmitter having a transmission power that is below a transmission power threshold, or
    a wireless access point based on IEEE 802.11x technical standard for mobile wireless communication.

12. The mobile device of claim 11, wherein each signal source is a Bluetooth™ low energy (BLE) device or a near field communication (NFC) device.

13. The mobile device of claim 10, the operations comprising adding a new signal source to the category-based fence by programming the new signal source to broadcast at least a portion of the category identifier.

14. The mobile device of claim 10, the operations comprising determining that the mobile device entered the first location or the second location, wherein the determining is based on determining that the mobile device has transitioned from an outdoor state to an indoor state.

15. The mobile device of claim 14, the operations comprising, after determining that the mobile device has entered the first location or the second location:

scanning a plurality of communication channels for signal source broadcasts;
determining that, for at least a threshold number of scans, none of one or more signal source identifiers received in each scan matches the category identifier;
determining that the mobile device has exited the category-based fence; and then
disabling the function.

16. A non-transitory storage device storing instructions that, when executed by one or more processors, cause the one or more processors to perform operations comprising:
   detecting, by a mobile device located at a first location, a first signal from a first signal source, the first signal including a first signal source identifier that matches a category identifier that is associated with a category-based fence, the category-based fence being a location-agnostic virtual fence corresponding to a group of signal sources located at a plurality of locations;
   in response to detecting the first signal from the first signal source, triggering a function of the mobile device, the function being associated with the category-based fence and a specification, the specification specifying that the function is to be activated in response to entry into the category-based fence by the mobile device;
   detecting, by the mobile device located at a second location that is different from the first location, a second signal from a second signal source, the second signal including a second signal source identifier that matches the category identifier; and
   in response to detecting the second signal from the second signal source, triggering the function associated with the category-based fence on the mobile device at the second location.

17. The non-transitory storage device of claim 16, wherein each signal source of the group is at least one of:
   a signal transmitter having a transmission power that is below a transmission power threshold, or
   a wireless access point based on IEEE 802.11x technical standard for mobile wireless communication.

18. The non-transitory storage device of claim 16, the operations comprising adding a new signal source to the category-based fence by programming the new signal source to broadcast at least a portion of the category identifier.

19. The non-transitory storage device of claim 16, the operations comprising determining that the mobile device entered the first location or the second location, wherein the determining is based on determining that the mobile device has transitioned from an outdoor state to an indoor state.

20. The non-transitory storage device of claim 19, the operations comprising, after determining that the mobile device has entered the first location or the second location:
   scanning a plurality of communication channels for signal source broadcasts;
   determining that, for at least a threshold number of scans, none of one or more signal source identifiers received in each scan matches the category identifier;
   determining that the mobile device has exited the category-based fence; and then
   disabling the function.

* * * * *